(12) United States Patent
Murai

(10) Patent No.: US 6,952,582 B2
(45) Date of Patent: Oct. 4, 2005

(54) MOBILE COMMUNICATION SYSTEM AND METHOD OF MATCHING CURRENT LOCATION INFORMATION FOR A MOBILE STATION

(75) Inventor: Kiyokazu Murai, Tokyo (JP)

(73) Assignee: NEC Corporation, Tokyo (JP)

( * ) Notice: Subject to any disclaimer, the term of this patent is extended or adjusted under 35 U.S.C. 154(b) by 550 days.

(21) Appl. No.: 09/931,107

(22) Filed: Aug. 17, 2001

(65) Prior Publication Data

US 2002/0025814 A1 Feb. 28, 2002

(30) Foreign Application Priority Data

Aug. 18, 2000 (JP) .................................. 2000-248576

(51) Int. Cl.[7] .................................................. H04Q 7/20
(52) U.S. Cl. ................ 455/433; 455/432.1; 455/435.1; 455/456.1
(58) Field of Search .......................... 455/435.1, 432.1, 455/432.2, 456.1, 433, 435.2, 456.2, 456.5

(56) References Cited

U.S. PATENT DOCUMENTS

| | | | | |
|---|---|---|---|---|
| 5,590,133 A | * | 12/1996 | Billstrom et al. | 370/349 |
| 5,793,762 A | | 8/1998 | Penners et al. | |
| 5,889,770 A | * | 3/1999 | Jokiaho et al. | 370/337 |
| 6,137,791 A | * | 10/2000 | Frid et al. | 370/352 |
| 6,160,804 A | * | 12/2000 | Ahmed et al. | 370/349 |
| 6,389,008 B1 | * | 5/2002 | Lupien et al. | 370/352 |
| 6,505,047 B1 | * | 1/2003 | Palkisto | 455/456.1 |
| 6,643,511 B1 | * | 11/2003 | Hu et al. | 455/433 |
| 6,654,607 B1 | * | 11/2003 | Shobatake et al. | 455/433 |
| 6,711,147 B1 | * | 3/2004 | Barnes et al. | 370/338 |
| 6,731,621 B1 | * | 5/2004 | Mizutani et al. | 370/338 |
| 6,747,961 B1 | * | 6/2004 | Ahmed et al. | 370/328 |

FOREIGN PATENT DOCUMENTS

| | | |
|---|---|---|
| JP | 8-46643 | 2/1996 |
| JP | 10-303981 | 11/1998 |
| JP | 11-355281 | 12/1999 |
| JP | 2000-507429 | 6/2000 |
| JP | 2001-518266 | 10/2001 |
| WO | WO 99/16266 | 4/1999 |
| WO | WO 99/17459 | 4/1999 |
| WO | WO 99/63774 | 9/1999 |
| WO | WO 00/02406 | 1/2000 |

\* cited by examiner

Primary Examiner—Temica Beamer
(74) Attorney, Agent, or Firm—McGinn & Gibb, PLLC

(57) ABSTRACT

In a mobile communication system which comprises a mobile station (1), a radio network (2) for radio transmission and reception to and from the mobile station, a home location register (HLR) (4) for managing, through a mobile services-switching center (3), current location information representative of a current location of the mobile station in a public telephone network, and a home agent (HA) (7) for managing, through a packet gateway (6), current location information representative of a current location of the mobile station in a packet data communication network, the home location register and the home agent are connected to each other through a communication channel (15) for transmission of update contents for the current location information managed by the home location register and the home agent. The home location register and the home agent are provided with location information update units (13, 14) responsive to the update contents for updating the current location information managed by the home location register and the home agent, respectively.

16 Claims, 6 Drawing Sheets

| <HLR> | | <HA> | |
|---|---|---|---|
| RN NUMBER | 00-0000 | FA ADDRESS | 10.000.000.001 |
| | 00-0001 | | 10.000.000.002 |
| | 00-0002 | | 10.000.000.003 |
| | ⋮ | | ⋮ |
| | 99-9999 | | 10.090.090.099 |

MOBILE COMMUNICATION SYSTEM AND METHOD OF MATCHING CURRENT LOCATION INFORMATION FOR A MOBILE STATION

BACKGROUND OF THE INVENTION

This invention relates to a mobile communication system and a method of matching current location information for a mobile station and, in particular, to a mobile communication system and a method of matching current location information for a mobile station upon introduction of packet data communication services.

A related mobile communication system will hereinafter be described with reference to the drawing.

Referring to FIG. 1, the related mobile communication system comprises a mobile station (MS) 1, first and second radio networks (RN) 2 and 18, a mobile services-switching center (MSC) 3, and a home location register (HLR) 4. In mobile communication, location registration is generally carried out as follows. It is assumed that the MS 1 is turned on within a first service area assigned to the first RN 2 or that the MS 1 being moved enters into the first service area. In this event, the MS 1 transmits a location registration update request signal through the first RN 2 and the MSC 3 to the HLR 4. The HLR 4 preliminarily memorizes subscriber data associated with the MS 1 and including current location information representative of a current location of the MS 1, i.e., a service area where the MS 1 is present. In response to the location registration update request signal, the HLR 4 updates the current location information memorized therein so that the current location information indicates the first service area assigned to the first RN 2.

When a call signal addressed to the MS 1 is received from a public telephone network, the MSC 3 refers to the current location information and transmits the call signal to the first RN 2 corresponding thereto.

In the recent mobile communication environment, data communication services are introduced. In particular, high-speed packet data communication services utilizing packet communication are started and operated in a large scale.

In the packet data communication services, user data are transmitted and received between the MS 1 and a packet data communication network through the first RN 2 and a packet gateway (PGW) 6 without passing through the MSC 3.

A communication network generally called an internet represents one mode of the packet data communication network.

Therefore, the PGW 6 is required to continuously grasp which RN is to be selected for transmission of the user data following the movement of the MS 1. For this purpose, a so-called home agent (HA) 7 for managing the current location information is required for the packet data communication services.

In correspondence to the HA 7, the first and the second RN 2 and 18 are provided with first and second foreign agents (FA) 8, respectively. Between the HA 7 and each of the first and the second FAs 8 and 19, update management for the current location information associated with the MS 1 is continuously carried out.

A communication protocol to be used herein is under research and investigation in various countries in the world on the basis of MIP (Mobile Internet Protocol) <RFC2026 et al>constructed by IETF (Internet Engineering Task Force) which is an international internet protocol research organization.

In an interim result of research, the basic concept is such that the MS 1 periodically transmits a "current location report" to the first or the second RN 2 or 18 and, in response to the current location report, the update management for the current location information associated with the mobile station 1 is carried out between the first or the second FA 8 or 19 and the HA 7.

However, in the conventional mobile communication system and the method of matching the current location information for the mobile station, the current location information for each single MS is doubly managed individually by the HLR for ordinary mobile communication and by the HA for the packet data communication. At present, there is no arrangement or means for matching the current location information between the HLR and HA. This inevitably results in mismatching in MS registration state or latest current location information.

Upon occurrence of mismatching in current location information, the call signal or the user data will undesirably be transmitted to a different RN having a service area where the MS is not present.

In case where the "current location report" is periodically transmitted as mentioned above in order to update the current location information in the HA, traffic in a radio section is increased. This results in suppression of efficiency of use of a radio channel intended for speech communication and data communication.

SUMMARY OF THE INVENTION

It is therefore an object of this invention to provide a mobile communication system and a method of matching current location information for a mobile station, which are capable of carrying out registration of subscriber data and updating of location information in a unified manner in case where the mobile station uses ordinary mobile communication services and packet data communication services.

According to a first aspect of this invention, there is provided a mobile communication system which comprises a mobile station (1), a radio network (2) for radio transmission and reception to and from the mobile station, a home location register (4) for managing, through a mobile services-switching center (3), current location information representative of a current location of the mobile station in a public telephone network, and a home agent (7) for managing, through a packet gateway (6), current location information representative of a current location of the mobile station in a packet data communication network, wherein the home location register and the home agent are connected to each other through a communication channel (15) for transmission of update contents for the current location information managed by the home location register and the home agent and are provided with location information update units (13, 14) responsive to the update contents for updating the current location information managed by the home location register and the home agent, respectively.

With the above-mentioned structure, it is possible to establish matching between the current location information managed by the home location register and corresponding to the public telephone network and the current location information managed by the home agent and corresponding to the packet data communication network.

Furthermore, it is unnecessary to periodically transmit a current location report from the mobile station to the home agent. Therefore, an increase in signal traffic is suppressed.

It is noted here that the home agent is an agent for managing a single mobile station. This also applies to the home location register.

According to a second aspect of this invention, there is provided a mobile communication system according to the first aspect, wherein the home location register is provided with a home agent register (10) which carries out, in the home location register, registration of identifying information of the home agent corresponding to the mobile station, the home location register being provided with a subscriber register (11) which remotely carries out subscriber registration of the mobile station into the home agent through the communication channel.

With the above-mentioned structure, it is possible to avoid mismatching between subscriber registration states in the home location register and the home agent.

The above-mentioned structure is convenient for a subscriber because the subscriber registration is collectively carried out for both of the public telephone network and the packet data communication network and is reliably and instantaneously carried out via connection-oriented communication using the public telephone network.

According to a third aspect of this invention, there is provided a mobile communication system according to the first or the second aspect, wherein at least one of the home location register and the home agent is provided with a current location information conversion table (9) for converting an indication format of the current location information managed by the at least one of the home location register and the home agent.

With the above-mentioned structure, each of the home location register and the home agent refers to the current location information conversion table so that the current location information update content is transmitted in an appropriate format or the current location information is updated in response to the current location update content in a different format.

According to a fourth aspect of this invention, there is provided a mobile communication system according to the second aspect, wherein connection between the home location register and the home agent via the communication channel is network connection utilizing a TCP/IP (Transmission Control Protocol/Internet Protocol) network, the identifying information of the home agent comprising a network address of the home agent on the TCP/IP network.

With the above-mentioned structure, connection between the home location register and the home agent is readily realized by a distributed network system so as to carry out transmission and reception. In addition, identification of the home agent can be carried out by the use of the network address.

According to a fifth aspect of this invention, there is provided a mobile communication system according to any one of the first through the fourth aspects, wherein the packet data communication network is an internet.

With the above-mentioned structure, it is possible to use internet resources.

According to a sixth aspect of this invention, there is provided a current location information matching method for a mobile communication system which comprises a mobile station (1), a radio network (2) for radio transmission and reception to and from the mobile station, a home location register (4) for managing, through a mobile services-switching center (3), current location information representative of a current location of the mobile station in a public telephone network, and a home agent (7) for managing, through a packet gateway (6), current location information representative of a current location of the mobile station in a packet data communication network, the current location information matching method being for matching the current location information of the mobile station in the public telephone network and the current location information of the mobile station in the packet data communication network, wherein the method comprising the steps of:

connecting the home location register and the home agent to each other through a communication channel (15);

carrying out, in the home location register, updating of the current location information of the mobile station in the public telephone network in response to a current location report transmitted from the mobile station to the radio network during mobile communication on the public telephone network to inform an update content through the communication channel to the home agent; and carrying out, in the home agent, updating of the current location information of the mobile station in the packet data communication network in response to a current location report transmitted from the mobile station to the radio network during packet data communication to inform an update content through the communication channel to the home location register.

With the above-mentioned method, it is possible to establish matching between the current location information managed by the home location register and corresponding to the public telephone network and the current location information managed by the home agent and corresponding to the packet data communication network.

In addition, it is unnecessary to periodically transmit the current location report from the mobile station to the home agent. Therefore, an increase in signal traffic is suppressed.

DESCRIPTION OF THE PREFERRED EMBODIMENT

Figure 1:
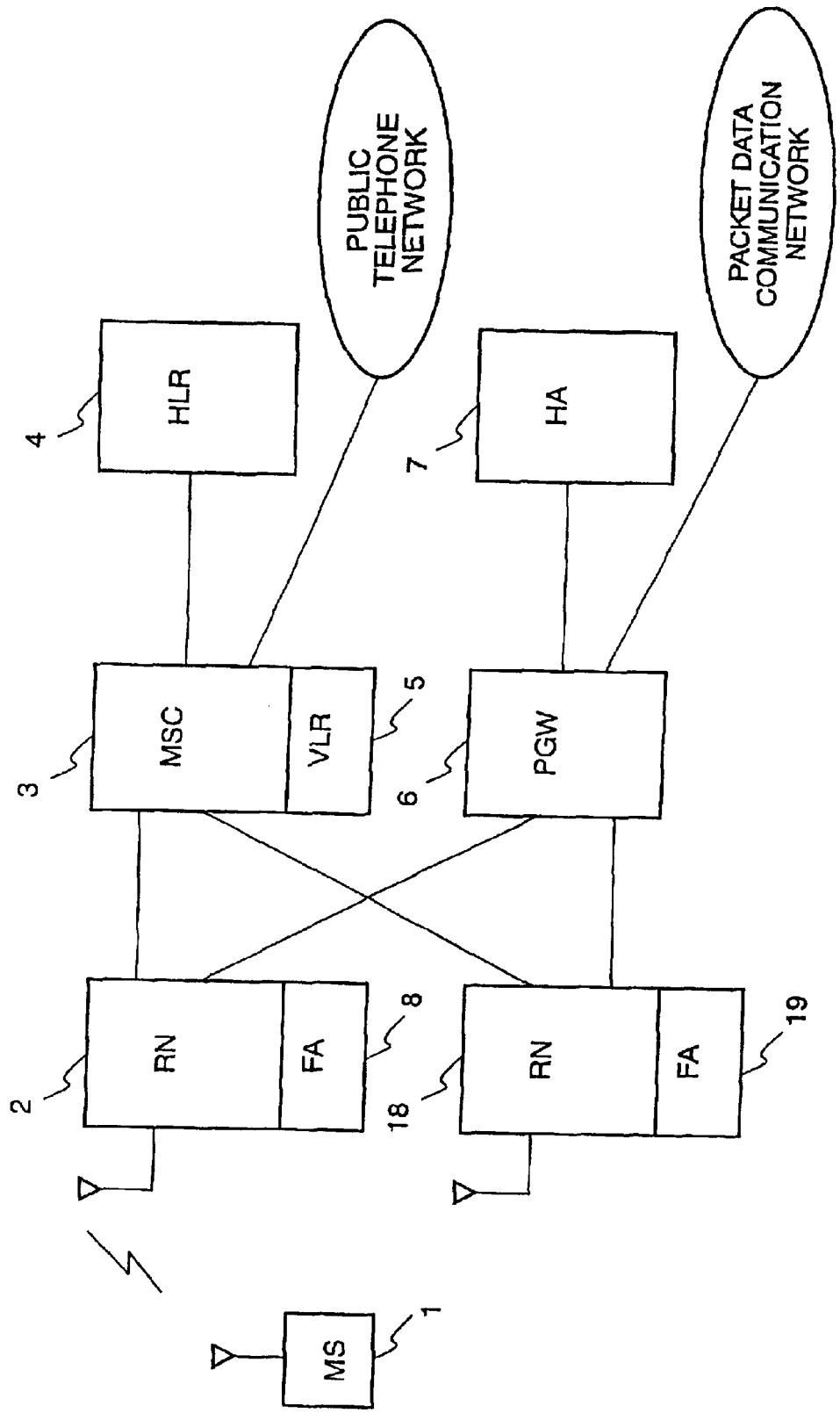
FIG. 1 is a view for describing a related mobile communication system and a related method of matching current location information for a mobile station.

Now, description will be made of one embodiment of this invention with reference to the drawing.

Figure 2:
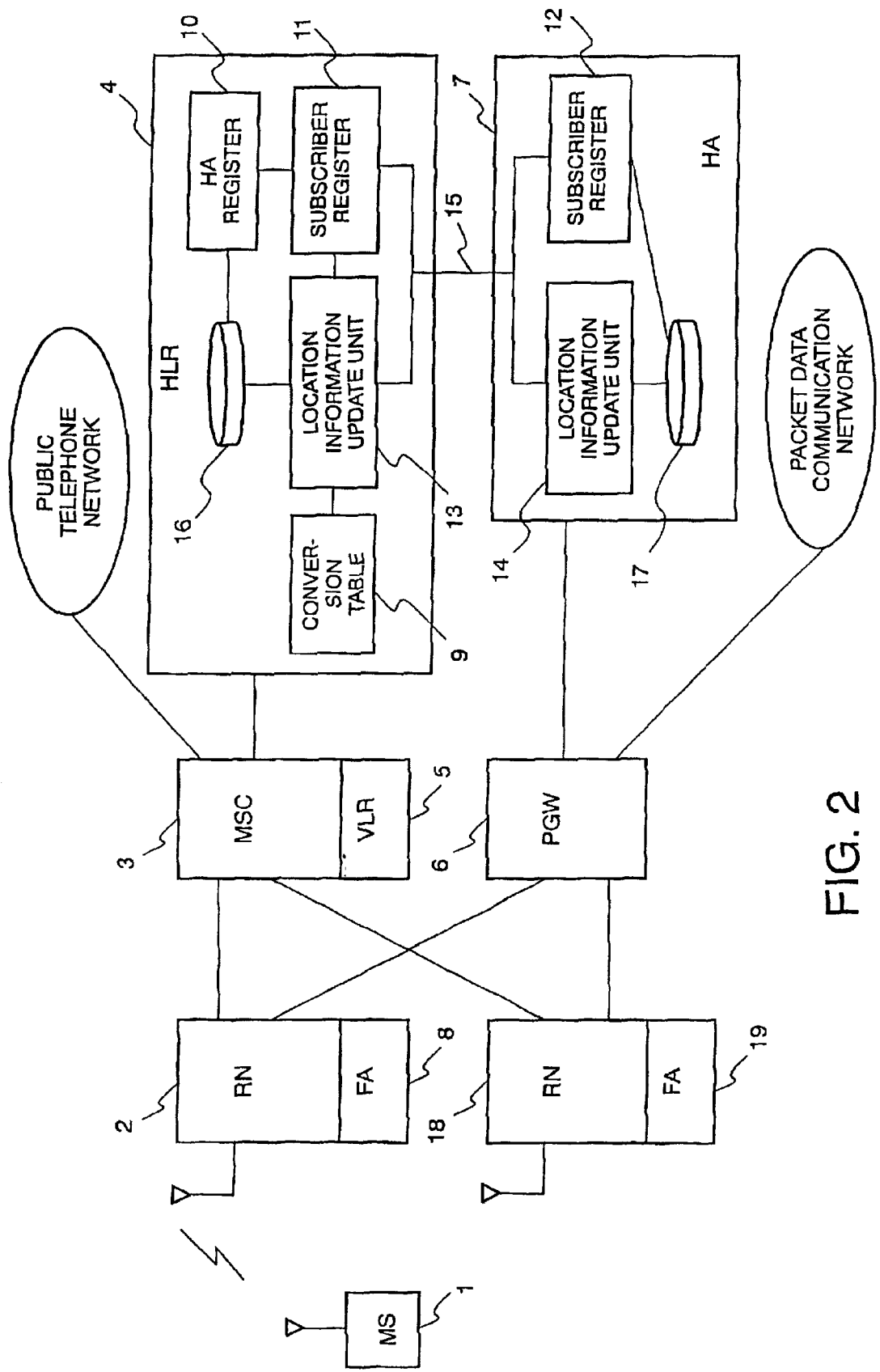
FIG. 2 is a block diagram for describing a mobile communication system and a method of matching current location information for a mobile station according to one embodiment of this invention.
Figure 3A:
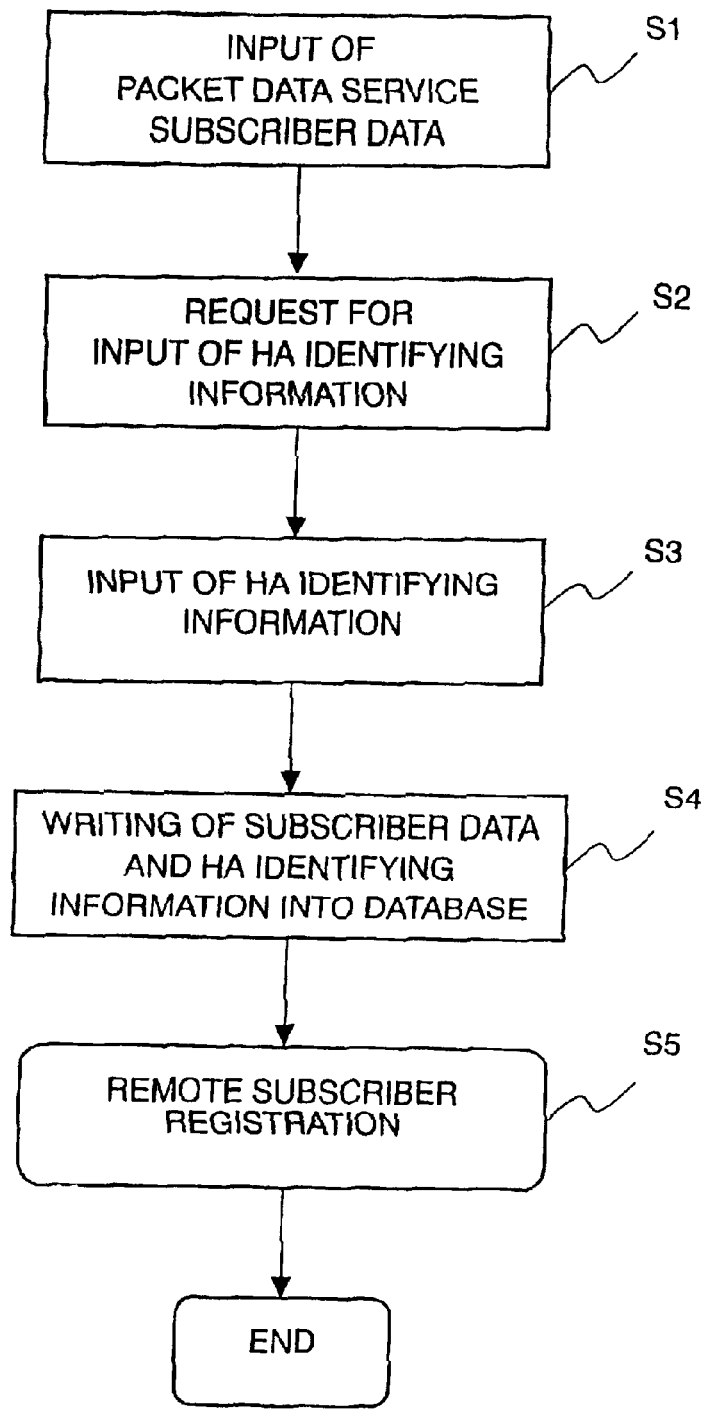
FIGS. 3A through 3C are flow charts for describing an operation of the mobile communication system according to the method illustrated in FIG. 2.
Figure 3B:
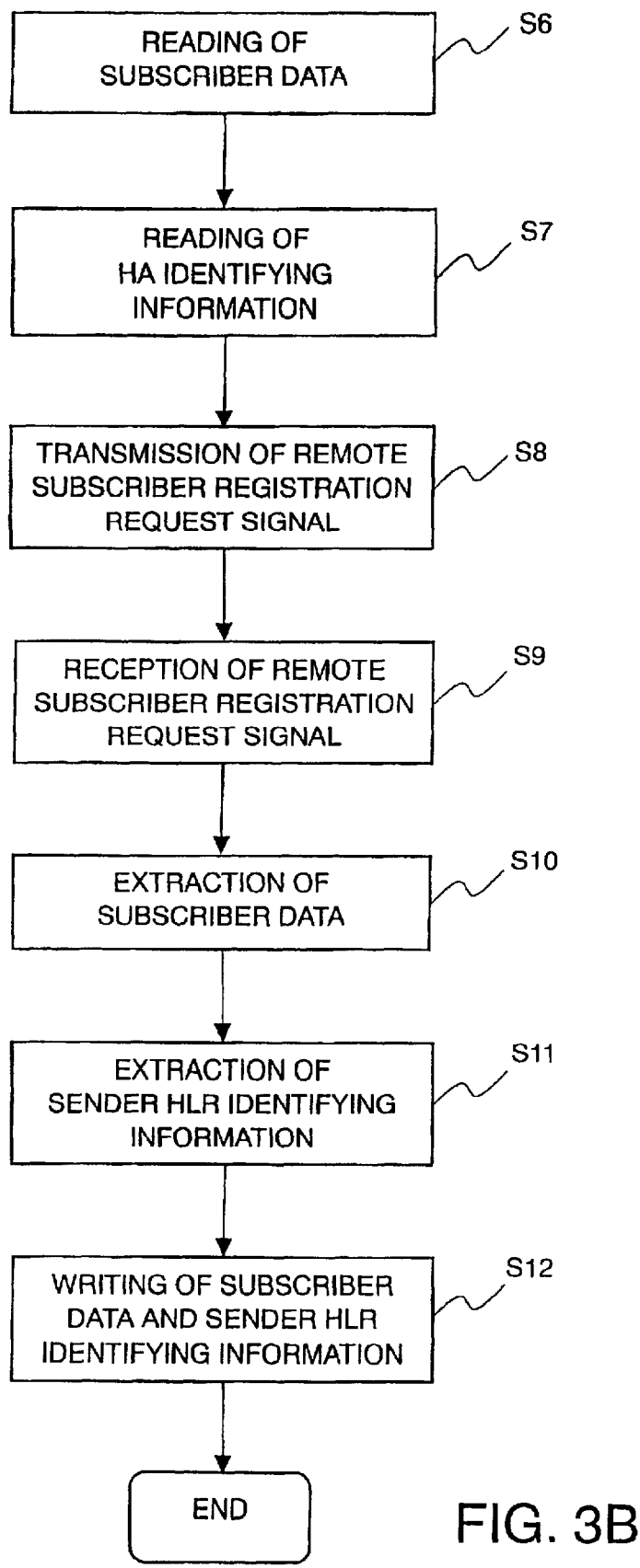
Figure 3C:
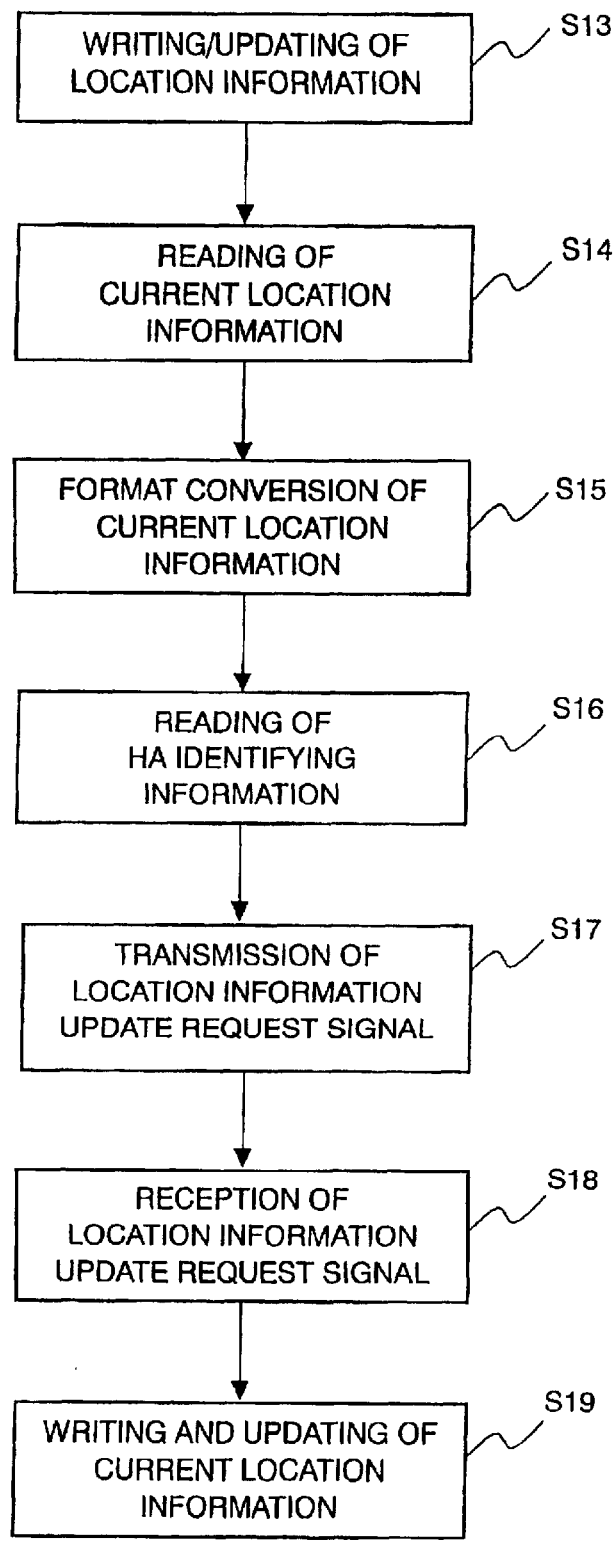

Referring to FIG. 2, a mobile communication system according to one embodiment of this invention comprises a mobile station (MS) 1, first and second radio networks (RN) 2 and 18 for carrying out radio transmission/reception to and from the MS 1, a mobile services-switching center (MSC) 3 for carrying out a switching operation on a public telephone network, a home location register (HLR) 4 for managing location information associated with the MS 1 on the public telephone network, a visitor location register (VLR) 5 provided in the MSC 3 to memorize MS information associated with the MS 1, a packet gateway (PGW) 6 for dealing with packet data communication services, a home agent (HA) 7 for managing location information associated with the MS 1 on a packet data communication network, and first and second foreign agents (FA) 8 and 19 provided in the first and the second RNs 2 and 18, respectively, for memorizing the MS information associated with the MS 1.

The HLR 4 and the HA 7 have subscriber databases 16 and 17 memorizing subscriber data associated with MS 1 and managed by the HLR 4 and the HA 7, respectively.

The HLR 4 is provided with a home agent register (HA register) 10. The HLR 4 and the HA 7 are provided with subscriber registers 11 and 12, respectively.

Furthermore, the HLR 4 and the HA 7 are provided with location information update units 13 and 14, respectively. The HLR 4 and the HA 7 are connected to each other through a communication channel 15.

For the communication channel 15, use may be made of various protocols such as X25, the common channel signaling system No. 7, the frame relay, and TCP/IP. Assuming the case where a plurality of HLRs 4 or a plurality of HAs 7 are present, connection using TCP/IP through LAN (Local Area Network) or WAN (Wide Area Network) is desirable.

In addition to the above-mentioned structure, at least one of the HLR 4 and the HA 7 is provided with a current location information conversion table 9 for converting an indication format of the current location information for the MS 1.

Next, description will be made of operations in the mobile communication system and the method of matching current location information for a mobile station according to the one embodiment of this invention with reference to the drawing.

At first, description will be made of operations of the HA register 10 and the subscriber registers 11 and 12.

As illustrated in FIGS. 2 through 5, a manager registers a packet data communication service subscriber in the HLR 4 by entering subscriber data (step S1). The HA register 10 requests an input of HA identifying information of the HA 7 where the subscriber in question is to be similarly registered (step S2).

In the embodiment of this invention, an IP address or an IP domain name is used as the HA identifying information.

When the manager enters the HA identifying information as requested (step S3), the HA register 10 writes the subscriber data and the HA identifying information supplied thereto into the subscriber database 16 (step S4).

Figures 4, 5:
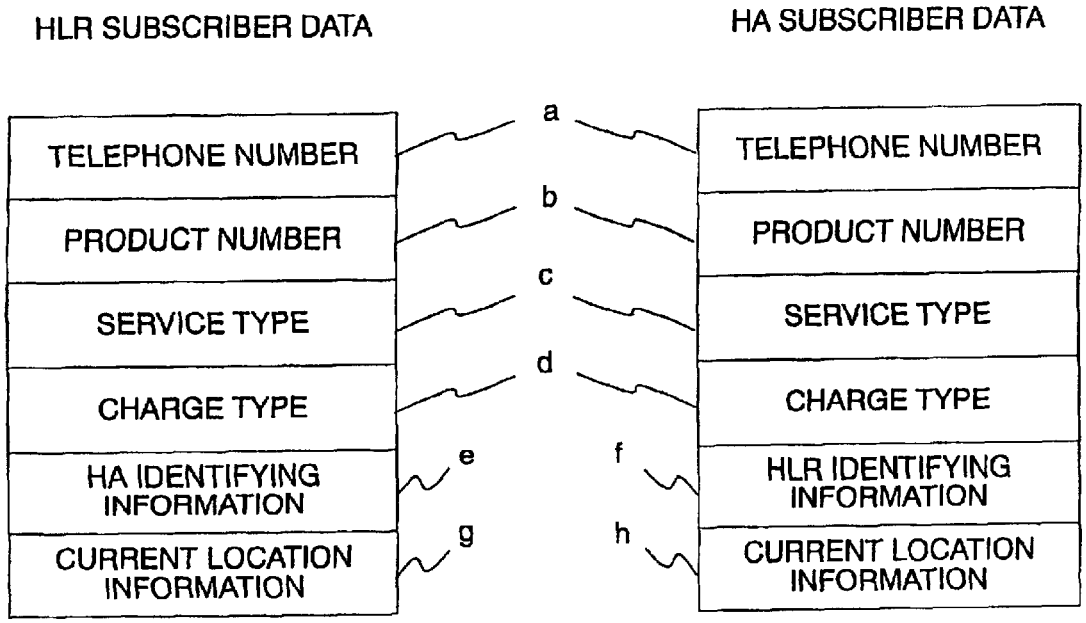
FIG. 4 is a view for describing subscriber data used in the mobile communication system and the method illustrated in FIG. 2.
FIG. 5 shows a current location information conversion table used in the mobile communication system and the method illustrated in FIG. 2.

Referring to FIG. 4, the subscriber database 16 memories the subscriber data (a–d) and the HA identifying information (e) as HLA subscriber data illustrated in the figure.

By way of example, the subscriber data contains a telephone number (a), a product number (b), a service type (c), and a charge type (d). Depending upon the system, various other data may be required. In the present specification, however, a minimum number of items are shown because the contents of the subscriber data have no direct concern with this invention.

Next, the HA register 10 activates the subscriber register 11 (step S5).

Activated by the HA register 10, the subscriber register 11 reads from the subscriber database 16 the subscriber data and the HA identifying information specified by the HA register 10 (steps S6 and S7).

The subscriber register 11 prepares a remote subscriber data registration request signal containing the subscriber data read from the subscriber database 16 and delivers the remote subscriber data registration request signal through the communication channel 15 to the HA 7 specified by the HA identifying information read from the subscriber database 16 (step S8).

When the subscriber register 12 of the HA 7 is supplied with the remote subscriber data registration request signal (step S9), the subscriber register 12 of the HA 7 extracts from the subscriber data registration request signal the subscriber data and sender HLR identifying information (steps S10 and S11) and writes the subscriber data and the sender HLR identifying information into the subscriber database 17 (step S12).

In the embodiment of this invention, an IP address or an IP domain name is used as the HLR identifying information.

The subscriber database 17 memorizes the subscriber data (a–d) and the HLR identifying information (f) as illustrated in FIG. 4.

By way of example, the subscriber data contains a telephone number (a), a product number (b), a service type (c), and a charge type (d). Depending upon the system, various other data may be required. In the present specification, however, a minimum number of items are shown because the contents of the data have no direct concern with this invention.

By the above-mentioned operation, the packet data communication service subscriber registered in the HLR 4 is simultaneously and automatically registered in the HA 7 also.

Next, description will be made of location registration in case where the MS 1 after the above-mentioned subscriber registration moves from one RN to another.

At first, the MS 1 is turned on within a first service area under the first RN 2. In this event, the MS 1 transmits a location registration request signal to the first RN 2. The first RN 2 sends the location registration request signal through the MSC 3 to the HLR 4 so that first RN identifying information is registered in the HLR 4 as the current location information associated with the MS 1.

When the MS 1 moves from the first service area under the first RN 2 to a second service area under the second RN 18, the MS 1 at first transmits a location registration request signal to the second RN 18.

Thereafter, the location registration request signal is sent through the MSC 3 to the HLR 4 so that the first RN identifying information registered in the HLR 4 is rewritten into second RN identifying information as current location information associated with the MS 1.

The above-mentioned operation is known in the art and is therefore not shown in a flow chart. The current location information is recorded in the subscriber database 16 in the HLR 4 (g in FIG. 4).

When the current location information is initially written or thereafter updated (step S13) as mentioned above, the location information update unit 13 arranged in the HLR 4 reads subscriber specifying information and the current location information g from the subscriber database 16 (step S14).

If the current location information memorized in the HLR 4 is different in format from the current location information memorized in the HA 7, for example, if FA identifying information is used in the HA 7, the current location information read from the subscriber database 16 is converted into a format to be memorized in the HA 7 with reference to the current location information conversion table 9 (step S15).

Referring to FIG. 5, the current location information conversion table 9 includes RN numbers for the HLR 4 and FA addresses for the HA 7.

Next, the location information update unit 13 reads the HA identifying information (e in FIG. 4) from the subscriber database 16 (step S16). The location information update unit 13 produces a location information update request signal including the subscriber specifying information and the current location information and sends the location information update request signal through the communication channel 15 to the HA 7 specified by the HA identifying information read from the subscriber database 16 (step S17).

On the other hand, the location information update unit 14 in the HA 7 receives the location information update request signal (step S18). Then, the location information update unit 14 extracts the current location information from the location information update request signal and writes the current location information in a current location information area (h in FIG. 4) in the subscriber data stored in the subscriber database 17 and specified by the location information update request signal. If existing current location information is already written, the existing current location information is rewritten into the current location information contained in the location information update request signal (step S19).

If the MS 1 moves between the first RN 2 to the second RN 18 during packet data communication, the current location information in the HA 7 is sometimes updated through the first or the second FA 8 or 19.

In this event, the current location information in the subscriber database 16 of the HLR 4 is updated in a manner reverse to that mentioned above.

Specifically, if the current location information is updated in the HA 7, the location information update unit 14 reads the subscriber specifying information and the current location information (h) from the subscriber database 17 in the manner similar to that mentioned above in connection with the location information update unit 13 in the HLR 4.

Thereafter, the location information update unit 14 edits or produces the location information update request signal including the subscriber specifying information and the current location information and sends the location information update request signal through the communication channel 15 to the HLR 4 specified by the HLR identifying information read from the subscriber database 17.

The location information remote update means 13 in the HLR 4 receives the location information update request signal and updates the current location information (g in FIG. 4) in the subscriber data stored in the subscriber database 16 and specified by the location information update request signal.

If the current location information memorized in the HLR 4 is different in format from the current location information memorized in the HA 7, for example, if the FA identifying information is used in the HLR 4, the current location information contained in the location information update request signal is converted into the format to be memorized in the HLR 4 with reference to the current location information conversion table 9.

As described above, the current locations managed by the HLR 4 and the HA 7 are always coincident with each other.

Description will be made of another embodiment of this invention. This embodiment is similar in basic structure to the foregoing embodiment except the current location information conversion table is arranged in a different position.

In the foregoing embodiment, the HLR 4 is provided with the current location information conversion table 9. When the location information update unit 13 in the HLR 4 transmits and receives the current location information to and from the HA 7, the current location information conversion table 9 is referred to so that the current location information is converted in format. As another embodiment, both of the HLR 4 and the HA 7 have current location information conversion tables, respectively. In this case, each of the location information update units 13 and 14 refers to the table only when the current location information is transmitted to the other or only when the current location information is received from the other, and carries out format conversion as required.

As still another embodiment, only the HA 7 is provided with the current location information conversion table. When the location information update unit 14 of the HA 7 transmits or receives the current location information to or from the HLR 4, the current location information conversion table is referred to and format conversion of the current location information is carried out.

In the mobile communication system in which services are mutually available between service areas geographically apart from each other or administrated by different providers, a plurality of HLRs and a plurality of HAs are included.

If the MS 1 moves between the service areas, location registration is generally updated between the HLR 4 or between the HLR and the VLR 5. Even in this event, it is possible to match the current location information between each HLR and each corresponding HA by applying the structure of this invention.

As described above, according to this invention, the existing home location register (HLR) for managing the current location information associated with the mobile station (MS) is connected to the home agent (HA) for managing the current location information required in the packet data communication services. The home location register (HLR) and the home agent (HA) are informed from each other of registration and updating of the current location information. With such basic structure, it is possible to match the current location information between the home location register (HLR) and the home agent (HA).

Furthermore, it is possible to prevent an invalid call and a user data loss due to mismatching in current location information and to prevent the mobile station from doubly or repeatedly carrying out the location updating operation individually for the HLR and the HA.

In addition, it is possible to provide the techniques of registering and updating the location information in the mobile communication system which are capable of effectively reducing the signal traffic in the radio section.

It will readily be understood that this invention is not restricted to the foregoing embodiments but may be appropriately modified in various manners within the scope of this invention.

What is claimed is:

1. A mobile communication system, comprising:
   a mobile station;
   a radio network for radio transmission and reception to and from said mobile station;
   a home location register for managing, through a mobile services-switching center, current location information representative of a current location of said mobile station in a public telephone network;
   a home agent for managing, through a packet gateway, current location information representative of a current location of said mobile station in a packet data communication network; and a communication channel connecting said home location register and said home agent to each other for transmission of update contents for the current location information managed by said home location register and said home agent, wherein:

each of said home location register and said home agent comprises a location information update unit responsive to the update contents for updating the current location information managed by said home location register and said home agent, respectively, and said home location register further comprises a subscriber register for remotely carrying out subscriber registration of said mobile station into said home agent through said communication channel.

2. A mobile communication system as claimed in claim 1, wherein at least one of said home location register and said home agent further comprises a current location information conversion table for converting an indication format of the current location information managed by said at least one of the home location register and the home agent.

3. A mobile communication system as claimed in claim 1, wherein:

said communication channel comprises a network connection utilizing a TCP/IP (Transmission Control Protocol/Internet Protocol) network, and the identifying information of said home agent comprises a network address of said home agent on said TCP/IP network.

4. A mobile communication system as claimed in claim 1, wherein said packet data communication network comprises an internet.

5. A current location information matching method for a mobile communication system which comprises a mobile station, a radio network for radio transmission and reception to and from said mobile station, a home location register for managing, through a mobile services-switching center, current location information representative of a current location of said mobile station in a public telephone network, and a home agent for managing, through a packet gateway, current location information representative of a current location of said mobile station in a packet data communication network, said method comprising:

connecting said home location register and said home agent to each other through a communication channel;

in said home location register, updating the current location information of said mobile station in said public telephone network in response to a current location report transmitted from said mobile station to said radio network during mobile communication on said public telephone network, and providing updated location information through said communication channel to said home agent; and in said home agent, updating the current location information of said mobile station in said packet data communication network in response to a current location report transmitted from said mobile station to said radio network during packet data communication, and providing updated location information through said communication channel to said home location register.

6. A mobile communication system, comprising:

a mobile station, a radio network for radio transmission and reception to and from said mobile station;

a home location register for managing, through a mobile services-switching center, current location information representative of a current location of said mobile station in a public telephone network;

a home agent for managing, through a packet gateway, current location information representative of a current location of said mobile station in a packet data communication network; and a communication channel connecting said home location register and said home agent to each other for transmission of update contents for the current location information managed by said home location register and said home agent, wherein:

said home location register comprises a home agent register for registering, in said home location register, identifying information of said home agent corresponding to said mobile station, and a subscriber register for remotely carrying out subscriber registration of said mobile station into said home agent through said communication channel.

7. A mobile communication system as claimed in claim 6, wherein at least one of said home location register and said home agent comprises a current location information conversion table for converting an indication format of the current location information managed by said at least one of the home location register and the home agent.

8. A mobile communication system as claimed in claim 6, wherein:

said communication channel comprises a network connection utilizing a TCP/IP (Transmission Control Protocol/Internet Protocol) network, and the identifying information of said home agent comprises a network address of said home agent on said TCP/IP network.

9. A mobile communication system as claimed in claim 6, wherein said packet data communication network comprises an internet.

10. A mobile communication system as claimed in claim 1, wherein said home location register further comprises a home agent register for registering, in said home location register, identifying information of said home agent corresponding to said mobile station.

11. A mobile communication system as claimed in claim 1, wherein a packet data communication service subscriber registered in the home location register is simultaneously registered in the home agent.

12. A current location information matching method as claimed in claim 5, wherein a packet data communication service subscriber registered in the home location register is simultaneously registered in the home agent.

13. A mobile communication system as claimed in claim 6, wherein a packet data communication service subscriber registered in the home location register is simultaneously registered in the home agent.

14. A mobile communication system as claimed in claim 1, wherein a packet data communication service subscriber registered in the home location register is automatically registered in the home agent.

15. A current location information matching method s claimed in claim 5, wherein a packet data communication service subscriber registered in the home location register is automatically registered in the home agent.

16. A mobile communication system as claimed in claim 6, wherein a packet data communication service subscriber registered in the home location register is automatically registered in the home agent.

* * * * *